(12) United States Patent
Karimli et al.

(10) Patent No.: US 10,750,375 B2
(45) Date of Patent: Aug. 18, 2020

(54) TIME-DIVISION MULTIPLEXING FOR 5G NETWORK COVERAGE EXTENSION

(71) Applicant: T-Mobile USA, Inc., Bellevue, WA (US)

(72) Inventors: Yasmin Karimli, Kirkland, WA (US);
Ming Shan Kwok, Seattle, WA (US);
Wei-Ming Lan, Morrisville, NC (US);
Thomas P. Lucht, Seattle, WA (US);
Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 44 days.

(21) Appl. No.: 16/202,013

(22) Filed: Nov. 27, 2018

(65) Prior Publication Data

US 2020/0068414 A1    Feb. 27, 2020

Related U.S. Application Data

(60) Provisional application No. 62/723,395, filed on Aug. 27, 2018.

(51) Int. Cl.
*H04W 16/26*    (2009.01)
*H04W 72/12*    (2009.01)
(Continued)

(52) U.S. Cl.
CPC .......... *H04W 16/26* (2013.01); *H04B 7/2606* (2013.01); *H04J 3/0647* (2013.01);
(Continued)

(58) Field of Classification Search
None
See application file for complete search history.

(56) References Cited

U.S. PATENT DOCUMENTS

2016/0295442 A1*  10/2016  Virtej ............... H04W 72/1284
2017/0208488 A1*  7/2017  Hwang ................ H04W 76/34
(Continued)

FOREIGN PATENT DOCUMENTS

| KR | 20180081436 A | 7/2018 |
|---|---|---|
| WO | WO2018029493 A1 | 2/2018 |

OTHER PUBLICATIONS

Bertenyi, et. al., "5G NR Radio Interface", Journal of ICT Standardization, Combined Special Issue 1 & 2, May 2018, vol. 6, No. 3, pp. 31-58.
(Continued)

*Primary Examiner* — Jamaal Henson
(74) *Attorney, Agent, or Firm* — Lee & Hayes, P.C.

(57) ABSTRACT

Techniques for time-division multiplexing for extending $5^{th}$ Generation (5G) network coverage are described herein. In an example, a device operating in a dual transmission mode for transmitting data via a first network node associated with a 5G network and a second network node associated with a $4^{th}$ Generation (4G) network at or near a same time, can determine a measurement associated with a transmission and/or receiving characteristic. The device can determine that the measurement meets or exceeds a threshold and, based at least in part on determining that the measurement meets or exceeds the threshold, the device can transition to an alternating transmission mode for transmitting data via the first network node and the second network node in an alternating pattern thereby extending 5G network coverage.

17 Claims, 6 Drawing Sheets

(51) Int. Cl.
    *H04J 3/06*     (2006.01)
    *H04B 7/26*     (2006.01)
    *H04J 3/16*     (2006.01)

(52) U.S. Cl.
    CPC ....... *H04J 3/1694* (2013.01); *H04W 72/1231* (2013.01); *H04W 72/1284* (2013.01)

(56) References Cited

U.S. PATENT DOCUMENTS

| | | | |
|---|---|---|---|
| 2018/0083743 A1 | 3/2018 | Chen et al. | |
| 2018/0302918 A1* | 10/2018 | Shaheen | H04W 76/27 |
| 2018/0368166 A1* | 12/2018 | Jheng | H04W 72/1284 |
| 2019/0058570 A1* | 2/2019 | Zhang | H04W 72/0453 |
| 2019/0158137 A1* | 5/2019 | Brunel | H04B 17/318 |
| 2019/0230396 A1* | 7/2019 | Snyder | H04N 21/2541 |
| 2019/0320396 A1* | 10/2019 | Bagheri | H04W 72/1289 |
| 2019/0363866 A1* | 11/2019 | Gaal | H04L 1/1819 |
| 2019/0380135 A1* | 12/2019 | Kwok | H04W 72/1257 |
| 2020/0008218 A1* | 1/2020 | Shih | H04W 72/1205 |
| 2020/0045761 A1* | 2/2020 | Zeng | H04W 72/1215 |
| 2020/0053792 A1* | 2/2020 | Ryu | H04W 76/15 |
| 2020/0059395 A1* | 2/2020 | Chen | H04W 24/10 |

OTHER PUBLICATIONS

Catt, "Reminaing Issues of LTE-NR Dual Connectivity", R1-1808383, 3GPP TSG RAN WG1 #94, Aug. 11, 2018, 4 pages.
The PCT Search Report and Written Opinion dated Nov. 22, 2019, for PCT Application No. PCT/US2019/045883, 12 pages.

\* cited by examiner

TIME-DIVISION MULTIPLEXING FOR 5G NETWORK COVERAGE EXTENSION

PRIORITY

This patent application claims priority to U.S. Provisional Patent Application No. 62/723,395, entitled "TIME-DIVISION MULTIPLEXING FOR 5G NETWORK COVERAGE EXTENSION", filed on Aug. 27, 2018, and is fully incorporated herein by reference.

BACKGROUND

Cellular communication devices use network radio access technologies to communicate wirelessly with geographically distributed cellular base stations. Long-Term Evolution (LTE) is an example of a widely implemented radio access technology that is used in $4^{th}$ Generation (4G) communication systems. New Radio (NR) is a newer radio access technology that is used in $5^{th}$ Generation (5G) communication systems. Standards for LTE and NR radio access technologies have been developed by the 3rd Generation Partnership Project (3GPP) for use by wireless communication carriers.

A communication protocol defined by the 3GPP, referred to as EN-DC (E-UTRAN/New Radio-Dual Connectivity) enables the simultaneous use of LTE and NR radio access technologies for communications between a mobile device and a cellular communication network. EN-DC may also be referred to as LTE/NR dual connectivity. EN-DC is described by 3GPP Technical Specification (TS) 37.340.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques described herein are directed to time-division multiplexing techniques for extending $5^{th}$ Generation (5G) network coverage. In at least one example, a device utilizing Long-Term Evolution (LTE)/New Radio (NR) dual connectivity can transition from a dual transmission mode for transmitting data to base stations associated with a $4^{th}$ Generation (4G) network and a 5G network substantially simultaneously to an alternating transmission mode for transmitting data to base stations associated with the 4G network and the 5G network in an alternating pattern. By utilizing an alternating pattern—that is, sending data to a base station associated with a 4G network at a first time and sending data to a base station associated with a 5G network at a second time—techniques described herein enable wireless communication carriers to extend 5G network coverage where such coverage would not be available using existing techniques.

In a dual transmission mode, a cellular communications device, or user equipment (UE), can transmit data to a LTE base station associated with the 4G network and a NR base station associated with the 5G network station substantially simultaneously (e.g., at or near a same time). However, as the UE travels away from the LTE base station and/or the NR base station, the network coverage can decrease, thereby providing a poor user experience. For instance, in at least one example, as the distance between the UE and the LTE base station and/or the NR base station increases, the UE requires more transmission power to transmit data to the LTE base station and/or the NR base station. The 3GPP TS 38.101 sets limitations with regard to the amount of transmission power that can be used by a UE transmitting via LTE/NR dual connectivity (e.g., 23 decibels per milliwatt (dBms) for combined LTE and 5G transmissions). When the UE is determined to be using an amount of transmission power that meets or exceeds a limit (e.g., 23 dBms), 5G network coverage becomes unavailable and the UE is permitted to transmit only via the 4G network (at least temporarily). That is, such limitations reduce 5G network coverage.

Further, as the distance between the UE and the LTE base station and/or the NR base station increases, the signal-to-noise ratio increases, thereby reducing the quality of service. For instance, when the UE is transmitting via both Band 71 (600 megahertz (MHz) 4G/LTE) and N-Band 71 (600 MHz 5G/NR), a high intermodulation distortion (IMD) value can cause desensitization and thus reduce the quality of service (e.g., poor resulting signal). That is, such limitations reduce 5G network coverage. Accordingly, as described above, various limitations restrict 5G network coverage in dual transmission mode.

Techniques described herein are directed to determining when to transition from the dual transmission mode to an alternating transmission mode to extend 5G network coverage. In at least one example, techniques described herein are directed to monitoring measurements of transmission and/or receiving characteristics and, based at least in part on determining that a measurement of the measurements meets or exceeds a threshold, transitioning the UE from the dual transmission mode to an alternating transmission mode. Such transmission and/or receiving characteristics can include, but are not limited to, transmission power, signal-to-noise ratio, radio frequency (RF) headroom, reference signal received power (RSRP), reference signal received quality (RSRQ), received signal strength indicator (RSSI), etc. In the alternating transmission mode, the UE can transmit data to the LTE base station and the NR base station in an alternating pattern. That is, in at least one example, the UE can transmit a first data item to the LTE base station and, after a delay in time, the UE can transmit a second data item to the NR base station. The UE can continue to transmit data items in an alternating pattern until the UE is in a position where the UE can transition back to the dual transmission mode. In some examples, techniques described herein are directed to monitoring measurements of transmission and/or receiving characteristics, after the transition to the alternating transmission mode, and, based at least in part on determining that a measurement of the measurements meets or exceeds another threshold, transitioning the UE from the alternating transmission mode to the dual transmission mode.

As described above, techniques described herein enable 5G network coverage extension. That is, by determining when to transition from a dual transmission mode to an alternating transmission mode—and effectuating such a transition—techniques described herein extend 5G network coverage beyond what is available with conventional techniques (e.g., only operating in the dual transmission mode). As a result, UEs can utilize the benefits of increased speed and throughput offered by the 5G network (vs. the 4G network) for a longer period of time than what is available with conventional technologies (e.g., only operating in the dual transmission mode). Furthermore, while UEs utilize both the 4G network and the 5G network via an alternating pattern, the quality of service can increase because the UEs are not transmitting via bands having the same frequency, and thus the amount of interference decreases. As such, techniques described herein can offer an improved user experience—faster data transmission (e.g., for uploading/downloading), fewer dropped calls, etc.—farther away from existing base stations than what is available with conventional techniques.

The systems, devices, and techniques described herein can be implemented in a number of ways. Example implementations are provided below with reference to the following figures.

Figure 1A:
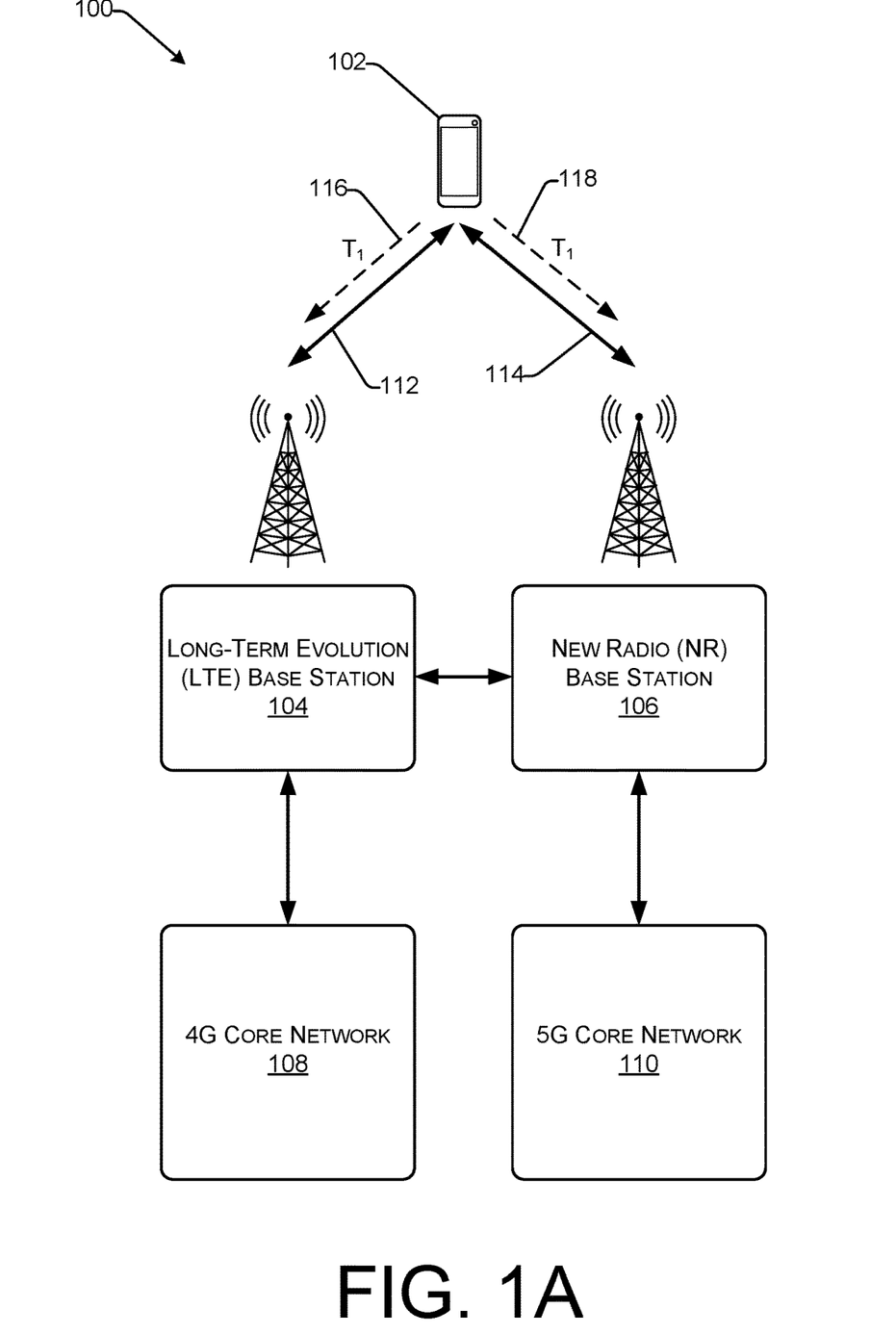
FIG. 1A illustrates an example environment including user equipment and various components implementing Long-Term Evolution (LTE)/New Radio (NR) dual connectivity, as described herein.

FIG. 1A illustrates an example environment 100 including user equipment and various components implementing LTE/NR dual connectivity, as described herein. The components shown in FIG. 1A can be used to implement dual connectivity. When implementing dual connectivity, a communication device can use both an LTE carrier and an NR carrier for uplink and downlink transmissions to and from respective LTE and NR base stations, as discussed herein. In some examples, the LTE carrier can be used for control-plane messaging and for user-plane communications and the NR carrier can be used for additional user-plane bandwidth.

For purposes of discussion, a 4G or LTE component is a component that performs according to 4G or LTE communications standards. A 4G or LTE signal or communication is a signal or communication that accords with 4G or LTE communications standards. A 5G or NR component is a component that performs according to 5G or NR communications standards. A 5G or NR signal or communication is a signal or communication that accords with 5G or NR communications standards.

In at least one example, the environment 100 can include a UE 102, which can include one or more transceivers that enable the UE 102 to transmit data and receive data via a first network node—a LTE base station 104—and a second network node—a NR base station 106. The LTE base station 104 can be associated with a 4G core network 108 and the NR base station 106 can be associated with a 5G core network 110.

The UE 102 can be one of any such devices that are configured for use within the environment 100. The UE 102 can comprise any of various types of cellular communication devices that are capable of wireless data and/or voice communications, including smartphones and other mobile devices, "Internet-of-Things" (IoT) devices, smart home devices, computers, wearable devices, entertainment devices, industrial control equipment, etc. In certain environments, the UE 102 can be referred to as a computing device, a cellular communications device, or a mobile station (MS). In at least one example, the UE 102 can have one or more transceivers that enable access to the 4G core network 108 (e.g., via the LTE base station 104) and the 5G core network 110 (e.g., via the NR base station 106).

The LTE base station 104 is configured in accordance with 4G LTE standards to communicate with devices, such as the UE 102, using the LTE radio access technology. The NR base station 106 is configured in accordance with 5G NR standards to communicate with devices using NR radio access technology. An LTE base station is often referred to as an eNodeB. An NR base station is often referred to as a gNodeB. In some examples, the LTE base station 104 can be referred to as a master base station and the NR base station 106 can be referred to as a secondary base station.

The LTE base station 104 and the NR base station 106 can, in some cases, be associated with each other by being co-located at a single cell site. Although only a single pair of base stations is shown in FIG. 1A, a network can include multiple cell sites, some of which might have both an LTE base station and an NR base station. In some examples, at least a portion of a geographic coverage area associated with the LTE base station 104 can overlap with a geographic coverage area associated with the NR base station 106.

During a data communication session, the UE 102 can establish a LTE data connection 112 with the LTE base station 104 and a NR data connection 114 with the NR base station 106. In some examples, the LTE data connection 112 can be a primary data connection. The LTE data connection 112 is a wireless communication channel that uses LTE radio access technology. In at least one example, the LTE base station 104 can utilize a frame and/or subframe structure for maintaining synchronization and managing different types of information that is exchanged with the UE 102. A frame has a predefined length (e.g., 10 milliseconds (ms)) and the frame is divided into subframes, each with lengths comprising a portion of the predefined length of the frame. This frame and/or subframe structure enables the LTE base station 104 to dynamically control uplink and downlink data transmissions (e.g., load balancing, etc.) for instance, in a time division duplex (TDD) system as described herein. In a frequency division duplex (FDD) system, which can also apply to techniques described herein, uplink and downlink data transmissions can utilize separate uplink and downlink frame and/or subframe structures.

As described above, during a data communication session, the UE 102 can establish a LTE data connection 112 with the LTE base station 104 and a NR data connection 114 with the NR base station 106. In some examples, the NR data connection 114 can be a secondary data connection. The secondary NR data connection 114 is a wireless communication channel that uses NR radio access technology. In at least one example, the NR base station 106 can utilize a frame and/or subframe structure for maintaining synchronization and managing different types of information that is exchanged with the UE 102. In at least one example, a frame has a length (e.g., 1 ms), which can be scalable, and the frame is divided into subframes, each with lengths comprising a portion of the length of the frame. This frame and/or subframe structure enables the NR base station 106 to dynamically control uplink and downlink data transmissions (e.g., load balancing, etc.) for instance, in a TDD system as described herein. In a FDD system, which can also apply to techniques described herein, uplink and downlink data transmissions can utilize separate uplink and downlink frame and/or subframe structures.

Although the UE 102 is described as communicating through a single cell site using both LTE and NR communications, it can be that in certain situations the LTE communications are through a LTE base station of a first cell site and the NR communications are through a NR base station of another cell site.

FIG. 1A illustrates an example implementation where the UE 102 is operating in a dual transmission mode. In at least one example, the UE 102 can send a first scheduling request 116 to the LTE base station 104 and a second scheduling request 118 to the NR base station 106. As illustrated in FIG. 1A, the first scheduling request 116 and the second scheduling request 118 can be sent at substantially the same time. That is, the first scheduling request 116 and the second scheduling request 118 can be sent within a threshold amount of time such that they are considered to be sent simultaneously.

Responsive to sending the scheduling requests (116 and 118), the UE 102 can receive instructions (e.g., scheduling instructions) from the LTE base station 104 and the NR base station 106 instructing the UE 102 when to transmit data. That is, the LTE base station 104 and the NR base station 106 can communicate with each other to determine a scheduling order for receiving data transmissions and can communicate such an order to the UE 102 responsive to receiving the first scheduling request 116 and the second scheduling request 118. The UE 102 can send one or more data transmissions based on the instructions received from the LTE base station 104 and the NR base station 106. In such an example, the one or more data transmissions can be sent substantially simultaneously. That is, in such an example, the UE 102 is substantially simultaneously transmitting data via the LTE base station 104 and the NR base station 106.

In some examples, as the UE 102 moves away from the LTE base station 104 and/or the NR base station 106, the quality of service can degrade due to various limitations, as described above. For instance, in at least one example, as the distance between the UE 102 and the LTE base station 104 and/or the NR base station 106 increases, the UE 102 requires more transmission power to transmit data to the LTE base station 104 and/or the NR base station 106. The 3GPP TS 38.101 sets limitations with regard to the amount of transmission power that can be used by a mobile device transmitting via LTE/NR dual connectivity (e.g., 23 dBm). When the UE 102 is determined to be using an amount of transmission power that meets or exceeds a limit, 5G network coverage becomes unavailable and the UE is permitted to transmit only via the 4G network (at least temporarily). That is, such limitations reduce 5G network coverage.

Further, as the distance between the UE 102 and the LTE base station 104 and/or the NR base station 106 increases, the signal-to-noise ratio increases, thereby reducing the quality of service. For instance, when the UE 102 is transmitting via both Band 71 (600 megahertz (MHz) 4G/LTE) and N-Band 71 (600 MHz 5G/NR), a high IMD value can cause desensitization and thus reduce the quality of service (e.g., poor resulting signal). That is, such limitations reduce 5G network coverage (or more precisely, reduce an ability of a UE to communicate with a base station, effectively reducing a size of the 5G network coverage).

As such, as described above, various limitations cause reductions in 5G network coverage.

Figure 1B:
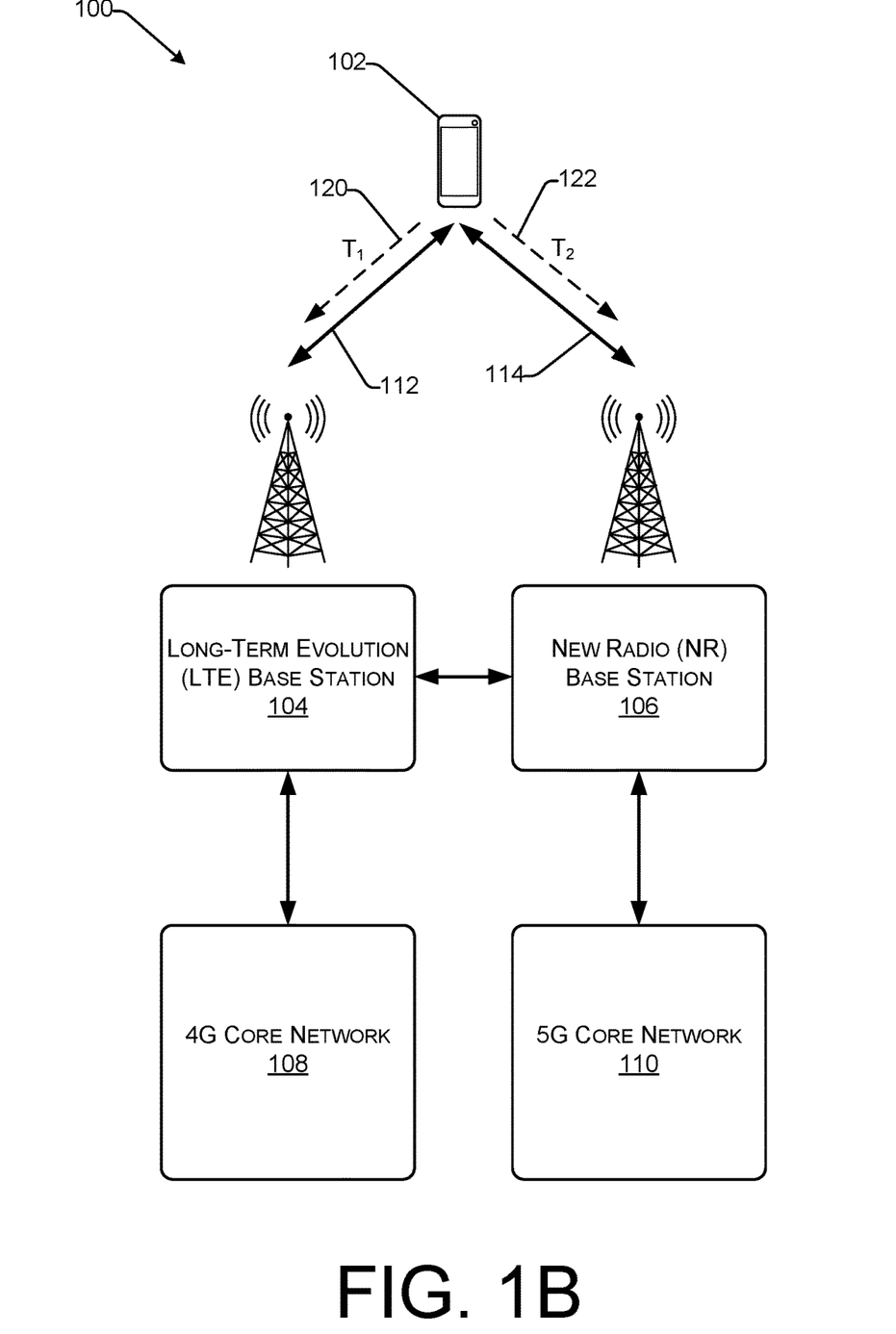
FIG. 1B illustrates an example environment including user equipment and various components implementing time-division multiplexing for 5G network coverage extension, as described herein.

FIG. 1B illustrates the example environment 100, wherein the user equipment and various components are implementing time-division multiplexing for 5G network coverage extension, as described herein. That is, FIG. 1B illustrates an example implementation where the UE 102 is operating in an alternating transmission mode. In at least one example, the UE 102 can send, at a first time, a first scheduling request 120 to the LTE base station 104 and, at a second time, a second scheduling request 122 to the NR base station 106. That is, as illustrated in FIG. 1B, the first scheduling request 120 and the second scheduling request 122 can be sent at different times (e.g., with a period of delay between the two scheduling requests). In at least one example, the delay between the first time and the second time can be determined based at least in part on a length of a frame and/or subframe as implemented by the LTE base station 104 and/or the NR base station 106. For instance, as a non-limiting example, the UE 102, if the frame and/or subframe length is 1 ms, the UE 102 can implement a 1 ms delay to cause an offset between when the first scheduling request and the second scheduling request are sent to the respective base stations.

Responsive to sending the scheduling requests (120 and 122), the UE 102 can receive instructions (e.g., scheduling instructions) from the LTE base station 104 and the NR base station 106 instructing the UE 102 when to transmit data. That is, the LTE base station 104 and the NR base station 106 can communicate with each other to determine a scheduling order for receiving data transmissions and can communicate such an order to the UE 102 responsive to receiving the first scheduling request 120 and the second scheduling request 122. In at least one example, the LTE base station 104 and the NR base station 106 can send instructions such to cause scheduling to be cascaded instead of simultaneous (e.g., as with the dual transmission mode). The UE 102 can send one or more data transmissions based on the instructions received from the LTE base station 104 and the NR base station 106. In such an example, the one or more data transmissions can be sent such that a first data transmission can be sent to the LTE base station 104 at a first time and a second data transmission can be sent to the NR base station 106 at a second time. As described above, a time delay between the first time and the second time can be determined based on frame and/or subframe lengths. Further, in some examples, an order of the first time and the second time (e.g., which base station the UE 102 transmits data to first) can be determined based on characteristics of data in a data buffer of the UE 102 (e.g., amount of data, type of data, etc.), downlink data transmissions (e.g., traffic), nature of the data/signal to be sent, etc.

As described above, techniques described herein are directed to determining when to transition from the dual transmission mode (e.g., FIG. 1A) to the alternating transmission mode (e.g., FIG. 1B) to extend 5G network coverage. In at least one example, the UE 102 can monitor measurements of transmission and/or receiving characteristics and, based at least in part on determining that a measurement of the measurements meets or exceeds a threshold, the UE 102 can transition from the dual transmission mode (e.g., FIG. 1A) to the alternating transmission mode (e.g., FIG. 1B). Such transmission and/or receiving characteristics can include, but are not limited to, transmission power, signal-to-noise ratio, RF headroom, RSRP, RSRQ, RSSI, etc.

The UE 102 can continue to transmit data in an alternating pattern until the UE 102 transitions back to the dual transmission mode. In some examples, the UE 102 can monitor measurements of transmission and/or receiving characteristics and, based at least in part on determining that a measurement of the measurements meets or falls below another threshold, the UE 102 can transition the UE from the alternating transmission mode to the dual transmission mode.

Figure 2:
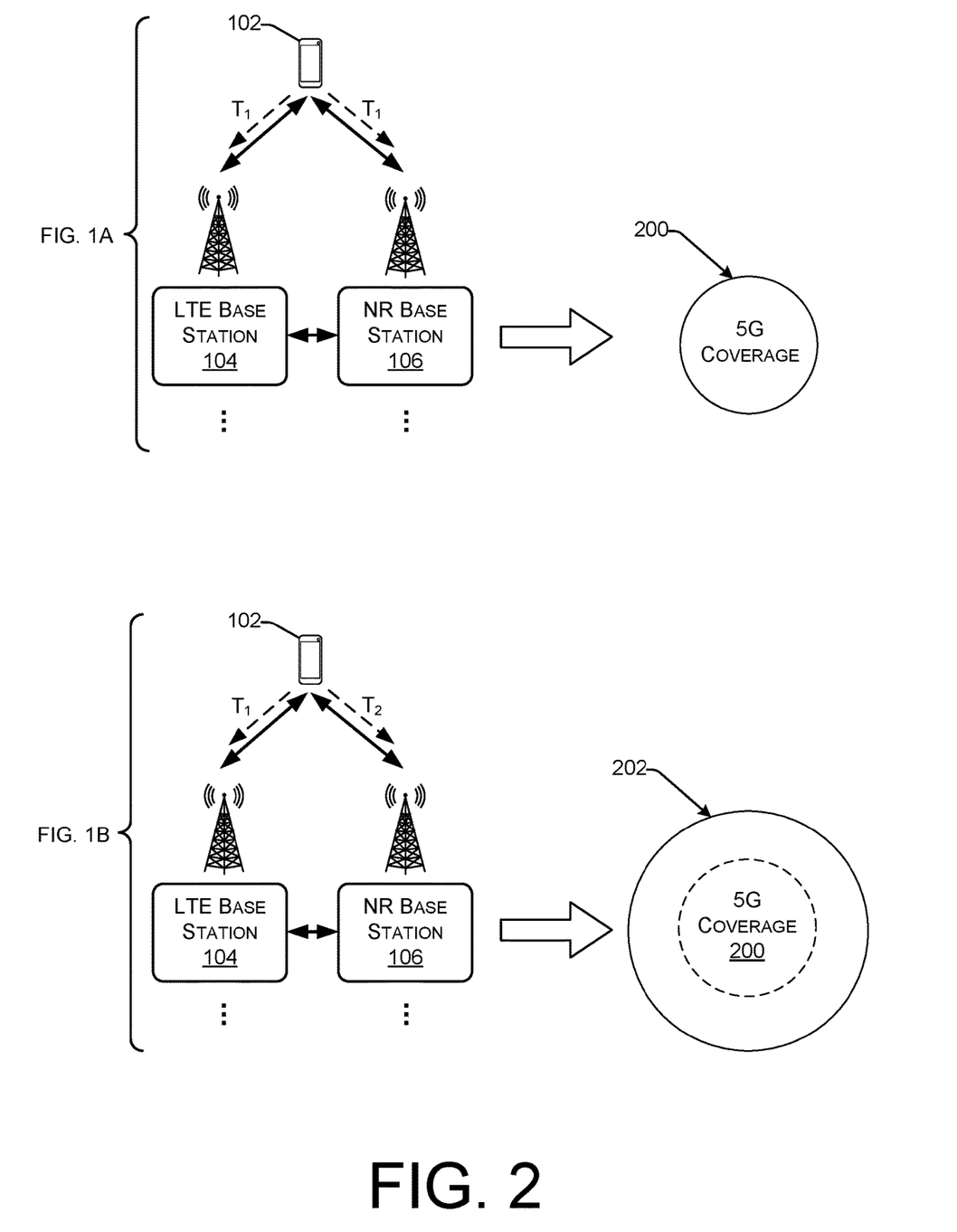
FIG. 2 illustrates an example environment illustrating 5G network coverage extension based on time-division multiplexing techniques, as described herein.

FIG. 2 illustrates 5G network coverage extension based on time-division multiplexing techniques described herein, as described herein. In FIG. 2, portions of FIGS. 1A and 1B are illustrated, but the core networks are not depicted for ease of viewing. Circle 200 represents an area associated with 5G coverage as a result of techniques described above with respect to FIG. 1A. That is, circle 200 represents an area associated with 5G coverage when the UE 102 is in dual transmission mode. On the other hand, circle 202 represents an area associated with 5G coverage as a result of techniques described above with respect to FIG. 1B. That is, circle 202 represents an area associated with 5G coverage when the UE 102 transitions to alternating transmission mode, as described herein. That is, by determining when to transition from a dual transmission mode to an alternating transmission mode—and effectuating such a transition—techniques described herein extend 5G network coverage beyond what is available with conventional technologies (e.g., only operating in the dual transmission mode, as shown in FIG. 1A). As a result, UEs can utilize the benefits of increased speed and throughput offered by the 5G core network 110 (vs. the 4G core network 108) for a longer period of time than what is available with conventional technologies (e.g., only operating in the dual transmission mode). As such, techniques described herein can offer an improved user experience—faster data transmission (e.g., for uploading/downloading), fewer dropped calls, etc.—farther away from existing base stations than what is available with conventional technologies.

Circles 200 and 202 are not drawn to scale and the coverage extension shown in FIG. 2 is not representative of any particular distance or measurement. That is, the coverage areas 200 and 202 are provided for illustrative purposes and should not be construed as limiting.

Figure 3:
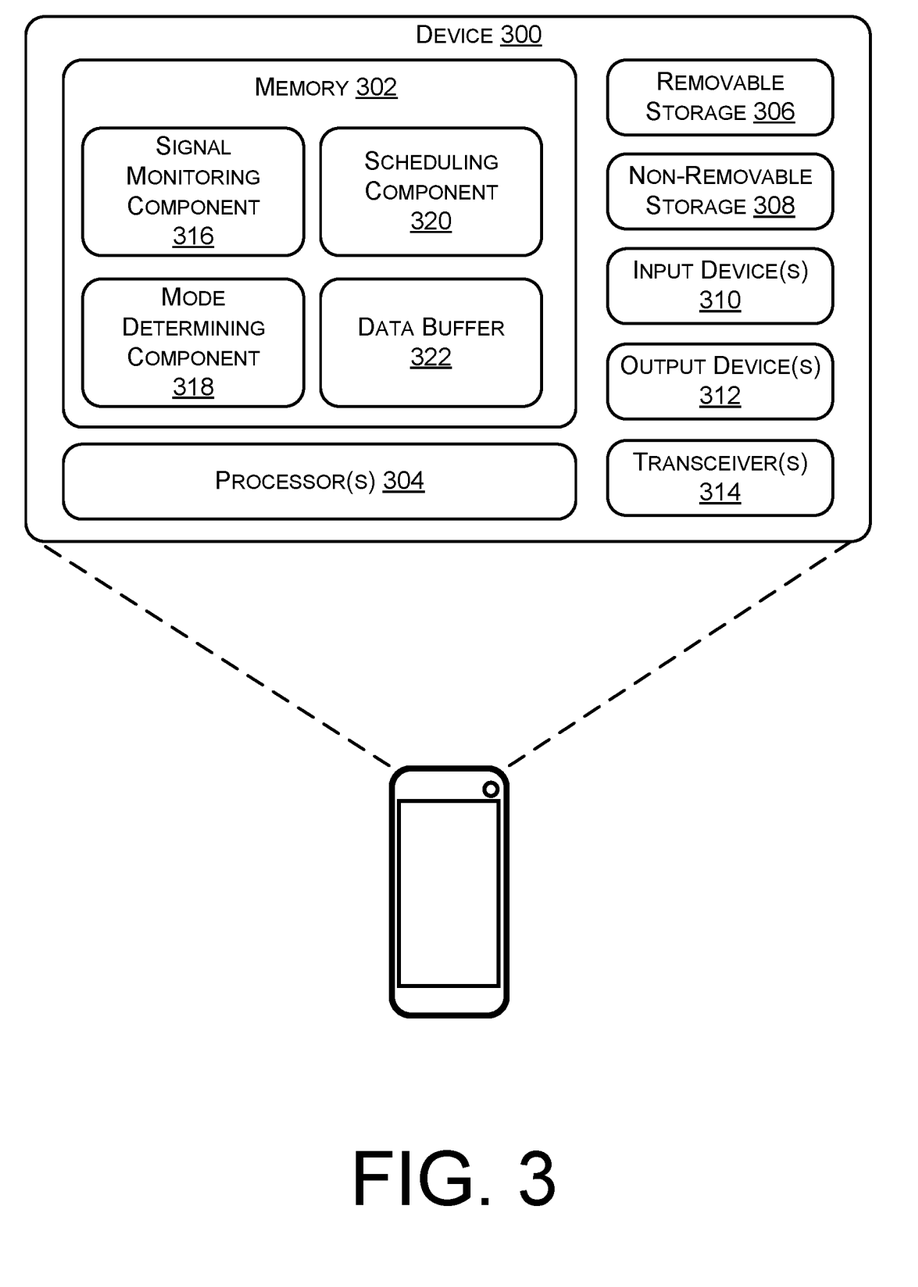
FIG. 3 illustrates an example device for implementing 5G network coverage extension based on time-division multiplexing techniques, as described herein.

FIG. 3 illustrates an example device 300 to implement the time-division multiplexing techniques, as described herein. The device 300 can correspond to UE 102 described above with reference to FIGS. 1A-1B. The device 300 can include memory 302, processor(s) 304, removable storage 306, non-removable storage 308, input device(s) 310, output device(s) 312, and transceiver(s) 326.

In various embodiments, the memory 302 is volatile (such as RAM), non-volatile (such as ROM, flash memory, etc.), or some combination of the two. The memory 302 can store a signal monitoring component 316, a mode determining component 318, a scheduling component 320, and a data buffer 322, which can comprise methods, threads, processes, applications or any other sort of executable instructions. The signal monitoring component 316, the mode determining component 318, the scheduling component 320, and the data buffer 322 can also include files and databases or other data repositories.

In at least one example, the signal monitoring component 316 can monitor measurements of transmission and/or receiving characteristics. As described above, transmission and/or receiving characteristics can include, but are not limited to, transmission power, signal-to-noise ratio, RF headroom, RSRP, RSRQ, RSSI, etc. Transmission power is a measurement of output power at which the device 300 is transmitting data. Transmission power can be measured in decibels per milliwatt (dBm). Signal-to-noise ratio is a measurement that compares the level of a signal (e.g., desired information) to the level of background noise (e.g., unwanted signal). RF headroom is a measurement that indicates the delta between a current transmitting power and the allowed maximum transmitting power.

The mode determining component 318 can determine when to transition from a first mode to a second mode (and vice versa). In at least one example, the mode determining component 318 can compare a measurement of a transmission and/or receiving characteristic with a threshold. If the device 300 is in the dual transmission mode, and the measurement meets or exceeds the threshold, the mode determining component 318 can determine to transition the device 300 from the dual transmission mode to the alternating transmission mode. In at least one example, this can be a high threshold (or a first threshold) hysteresis. If the device 300 is in the alternating transmission mode, and the measurement meets or falls below the threshold for a period of time, the mode determining component 318 can determine to transition the device 300 from the alternating transmission mode to the dual transmission mode. In some examples, the threshold can be the same as the high threshold (or the first threshold) hysteresis. In other examples, the threshold can be a lower threshold (or a second threshold) hysteresis.

As described above, in some examples, the threshold for triggering a transition from the dual transmission mode to the alternating transmission mode can be greater than the threshold for trigging a transition from the alternating transmission mode to the dual transmission mode. That is, in some examples, the threshold for trigging a transition from the alternating transmission mode to the dual transmission mode can be configured to be less than the threshold for triggering a transition from the dual transmission mode to the alternating transmission mode to ensure that the quality of service is maintained through the transition.

In some examples, each transmission and/or receiving characteristic can be associated with its own thresholds. That is, as a non-limiting example, transmission power can be associated with a 17 dBm threshold, such that if the transmission power of the device 300 meets or exceeds 17 dBm, the mode determining component 318 determines to transition the device 300 into the alternating transmission mode. Other transmission and/or receiving characteristics can be associated with their own thresholds. In at least one example, the mode determining component 318 can determine a single measurement meets or exceeds a threshold and can trigger a transition to a different mode. In other examples, the mode determining component 318 can determine multiple measurements meet or exceed a threshold and can trigger a transition to a different mode.

The scheduling component 320 can send and receive scheduling information via network nodes (e.g., the LTE base station 104 and the NR base station 106). In at least one example, the scheduling component 320 can send, at a first time, a first scheduling request to the LTE base station 104 and, at a second time, a second scheduling request to the NR base station 106. That is, the first scheduling request and the second scheduling request can be sent at different times (e.g., with a period of delay between the two scheduling requests). As described above, in at least one example, the delay between the first time and the second time can be determined based at least in part on a length of a frame and/or subframe as implemented by the LTE base station 104 and/or the NR base station 106. For instance, as a non-limiting example, if the frame and/or subframe length is 1 ms, the scheduling component 320 can implement a 1 ms delay to cause an offset between when the first scheduling request and the second scheduling request are sent to the respective base stations.

Responsive to sending the scheduling requests, the scheduling component 320 can receive instructions (e.g., scheduling instructions) from the LTE base station 104 and the NR base station 106 instructing the scheduling component 320 when to transmit data. That is, the LTE base station 104 and the NR base station 106 can communicate with each other to determine a scheduling order for receiving data transmissions and can communicate such an order to the scheduling component 320 responsive to receiving the first scheduling request and the second scheduling request. In at least one example, the LTE base station 104 and the NR base station 106 can send instructions such to cause scheduling to be cascaded instead of simultaneous (e.g., as with the dual transmission mode). The scheduling component 320 can send one or more data transmissions based on the instructions received from the LTE base station 104 and the NR base station 106. In such an example, the scheduling component 320 can send the one or more data transmissions such that a first data transmission can be sent to the LTE base station 104 at a first time and a second data transmission can be sent to the NR base station 106 at a second time. As described above, a time delay between the first time and the second time can be determined based on frame and/or subframe lengths. Further, in some examples, an order of the first time and the second time (e.g., which base station the device 300 transmits data to first) can be determined based on characteristics of data in the data buffer 322 (e.g., amount of data, type of data, etc.), downlink data transmissions (e.g., traffic), nature of the data/signal to be sent, etc.

The data buffer 322 can be a portion of storage on the device 300 that is used to temporarily store data before the data is transmitted to another location. In at least one example, the data buffer 322 can store one or more data items waiting to be transmitted by the device 300 to one or more network nodes (e.g., the LTE base station 104, the 5G base station 106, etc.). In at least one example, data can comprise one or more data items which can be transmitted together or separately via techniques described herein.

In some embodiments, the processor(s) 304 is a central processing unit (CPU), a graphics processing unit (GPU), or both CPU and GPU, or other processing unit or component known in the art.

The device 300 also includes additional data storage devices (removable and/or non-removable) such as, for example, magnetic disks, optical disks, or tape. Such additional storage is illustrated in FIG. 3 by removable storage 306 and non-removable storage 308. Tangible computer-readable media can include volatile and non-volatile, removable and non-removable media implemented in any method or technology for storage of information, such as computer readable instructions, data structures, program modules, or other data. The memory 302, the removable storage 306 and the non-removable storage 308 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The device 300 can be configured to communicate over a telecommunications network using any common wireless and/or wired network access technology. Moreover, the device 300 can be configured to run any compatible device operating system (OS), including but not limited to, Microsoft Windows Mobile, Google Android, Apple iOS, Linux Mobile, as well as any other common mobile device OS.

The device 300 also can include input device(s) 310, such as a keypad, a cursor control, a touch-sensitive display, voice input device, etc., and output device(s) 312 such as a display, speakers, printers, etc.

As illustrated in FIG. 3, the device 300 also includes one or more wired or wireless transceiver(s) 314. For example, the transceiver(s) 314 can include a network interface card (NIC), a network adapter, a LAN adapter, or a physical, virtual, or logical address to connect to various networks, devices, or components illustrated in the environment 100, for example. To increase throughput when exchanging wireless data, the transceiver(s) 314 can utilize multiple-input/multiple-output (MIMO) technology. The transceiver(s) 314 can comprise any sort of wireless transceivers capable of engaging in wireless, RF communication. That is, the transceiver(s) 314 can enable the device 300 to transmit data and receive data via a first network node—a LTE base station 104—and a second network node—a NR base station 106, as described above with reference to FIGS. 1A and 1B. The transceiver(s) 314 can also include other wireless modems, such as a modem for engaging in Wi-Fi, WiMAX, Bluetooth, infrared communication, and the like.

Figure 4:
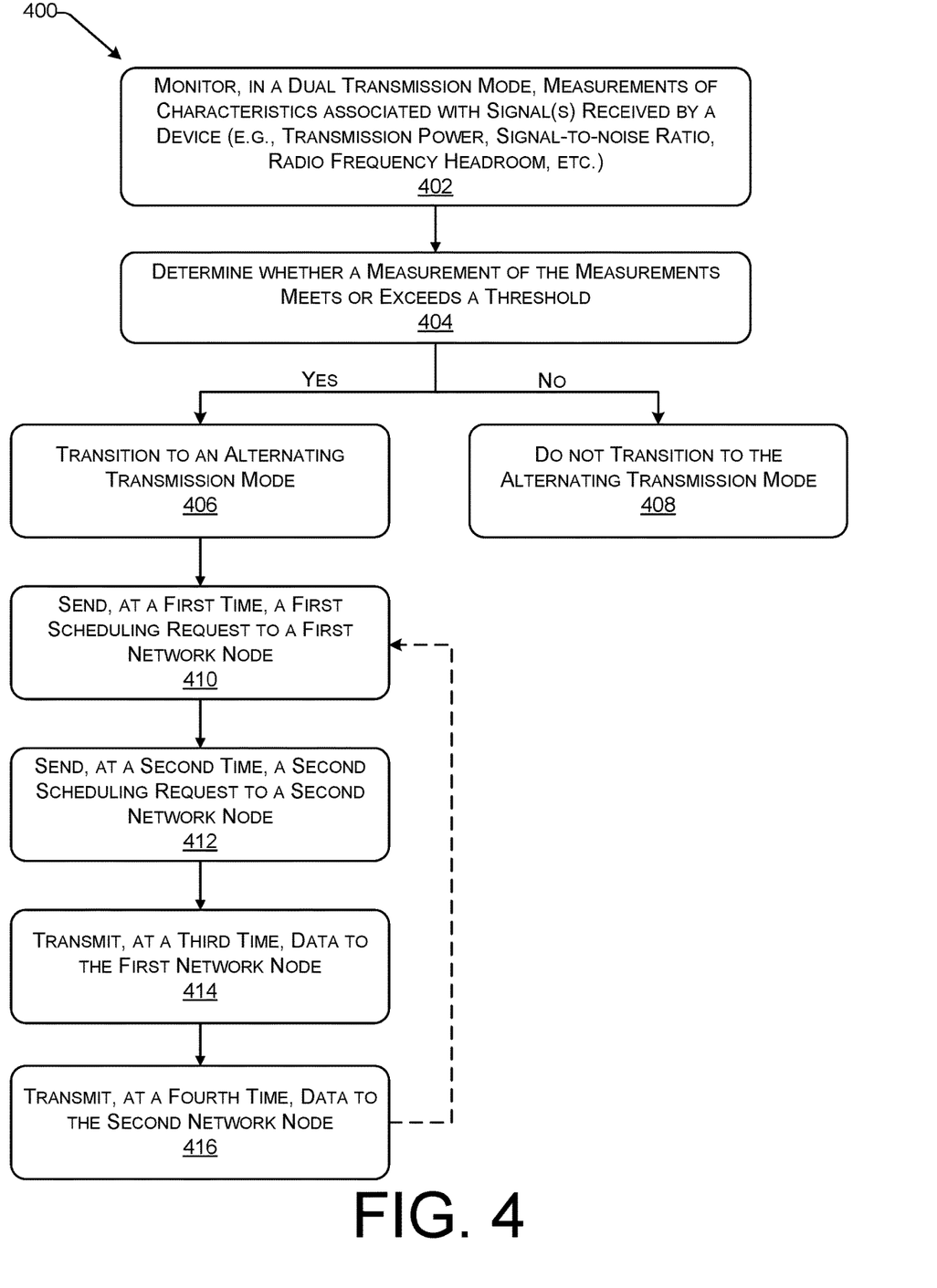
FIG. 4 illustrates an example process for transitioning from a dual transmission mode to an alternating transmission mode using time-division multiplexing techniques, as described herein.
Figure 5:
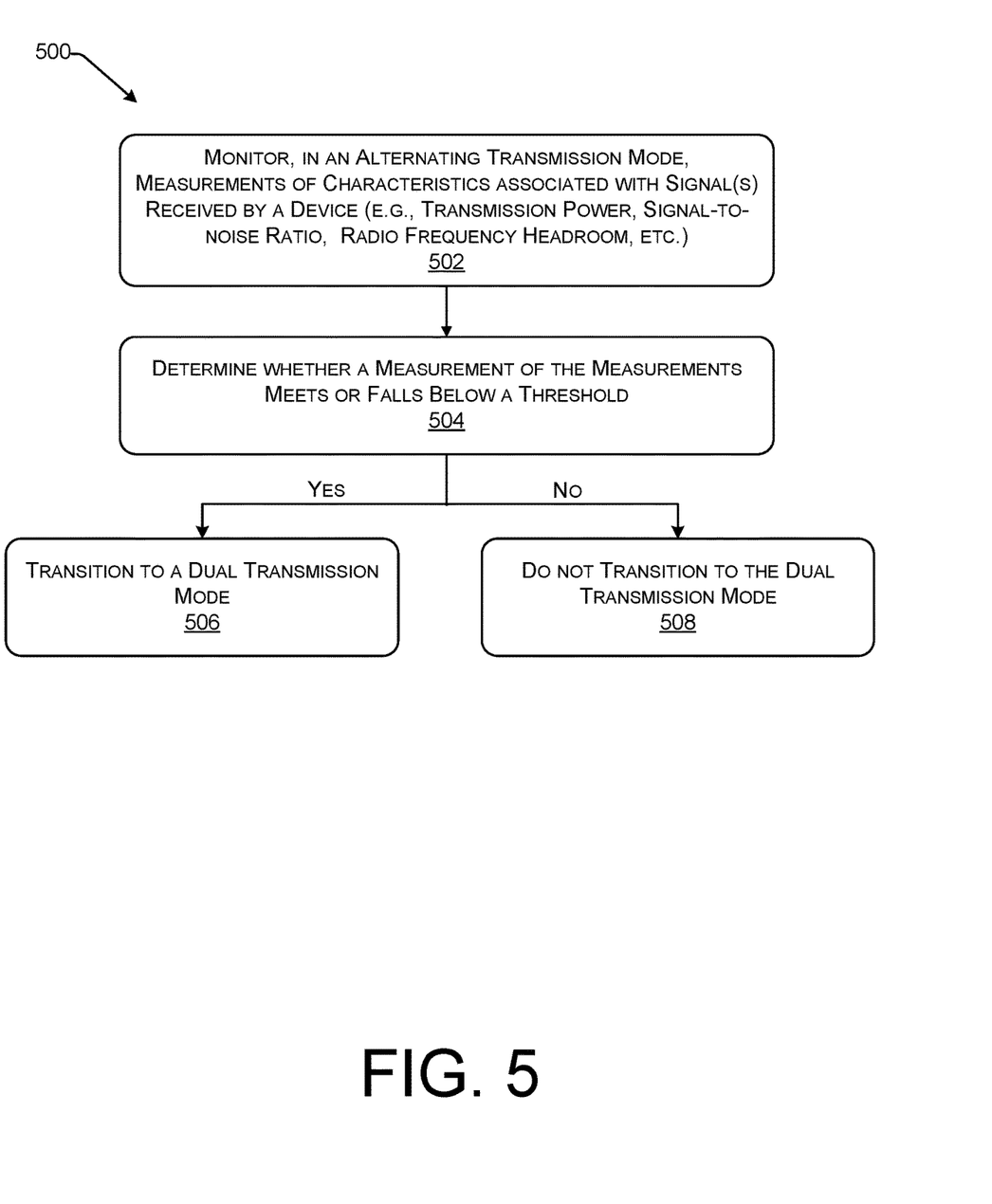
FIG. 5 illustrates an example process for transitioning from an alternating transmission mode to a dual transmission mode, as described herein.

FIGS. 4 and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIGS. 4 and 5 are described below in the environments of FIGS. 1A, 1B, 2, and 3, described above, but are not limited to such environments.

FIG. 4 illustrates an example process 400 for transitioning from a dual transmission mode to an alternating transmission mode, as described herein.

Block 402 illustrates monitoring, in a dual transmission mode, measurements of characteristics associated with signal(s) received by a device. As described above, in at least one example, the signal monitoring component 316 can monitor measurements of transmission and/or receiving characteristics. The transmission and/or receiving characteristics can include, but are not limited to, transmission power, signal-to-noise ratio, RF headroom, RSRP, RSRQ, RSSI, etc., as described above.

Block 404 illustrates determining whether a measurement of the measurements meets or exceeds a threshold. In at least one example, the mode determining component 318 can compare a measurement of a transmission and/or receiving characteristic with a threshold. If the device 300 is in the dual transmission mode, and the measurement meets or exceeds the threshold, the mode determining component 318 can determine to transition the device 300 from the dual transmission mode to the alternating transmission mode, as illustrated in block 406. If the device 300 is in the dual transmission mode, and the measurement does not meet or exceed the threshold, the mode determining component 318 can determine not to transition the device 300 from the dual transmission mode to the alternating transmission mode, as illustrated in block 408.

Block 410 illustrates sending, at a first time, a first scheduling request to a first network node. As described above, the scheduling component 320 can send and receive scheduling information via network nodes (e.g., the LTE base station 104 and the NR base station 106). In at least one example, the scheduling component 320 can send, at a first time, a first scheduling request to the LTE base station 104. In an alternative example, the scheduling component 320 can send the first scheduling request to the NR base station 106 instead of the LTE base station 104.

Block 412 illustrates sending, at a second time, a second scheduling request to a second network node. In at least one example, the scheduling component 320 can send, at a second time, a second scheduling request to the NR base station 106. In an alternative example, the scheduling component 320 can send the second scheduling request to the LTE base station 104 (e.g., if the first scheduling request was sent to the NR base station 106). As described above, the first scheduling request and the second scheduling request can be sent at different times (e.g., with a period of delay between the two scheduling requests). In at least one example, the delay between the first time and the second time can be determined based at least in part on a length of a frame and/or subframe as implemented by the LTE base station 104 and/or the NR base station 106. For instance, as a non-limiting example, if the frame and/or subframe length is 1 ms, the scheduling component 320 can implement a 1 ms delay to cause an offset between when the first scheduling request and the second scheduling request are sent to the respective base stations.

Block 414 illustrates transmitting, at a third time, data to the first network node. Responsive to sending the scheduling requests, the scheduling component 320 can receive instructions (e.g., scheduling instructions) from the LTE base station 104 and the NR base station 106 instructing the scheduling component 320 when to transmit data. That is, the LTE base station 104 and the NR base station 106 can communicate with each other to determine a scheduling order for receiving data transmissions and can communicate such an order to the scheduling component 320 responsive to receiving the first scheduling request and the second scheduling request. In at least one example, the LTE base station 104 and the NR base station 106 can send instructions such to cause scheduling to be cascaded instead of simultaneous (e.g., as with the dual transmission mode). The scheduling component 320 can send one or more data transmissions based on the instructions received from the LTE base station 104 and the NR base station 106. In such an example, the scheduling component 320 can send the one or more data transmissions such that a first data transmission can be sent to the LTE base station 104 at a third time (e.g., after the first time and the second time).

Block 416 illustrates transmitting, at a fourth time, data to the second network node. As described above, the scheduling component 320 can send one or more data transmissions based on the instructions received from the LTE base station 104 and the NR base station 106. In such an example, the scheduling component 320 can send the one or more data transmissions such that a second data transmission can be sent to the NR base station 106 at a fourth time. As described above, a time delay between the third time and the fourth time can be determined based on frame and/or subframe lengths. Further, in some examples, an order of the third time and the fourth time (e.g., which base station the device 300 transmits data to first) can be determined based on characteristics of data in the data buffer 322 (e.g., amount of data, type of data, etc.), downlink data transmissions (e.g., traffic), nature of the data/signal to be sent, etc.

As described above, the device 300 can continue to transmit data in an alternating pattern until the device 300 transitions back to the dual transmission mode. That is, process 400 can return to block 410, and repeat blocks 410-416, until the device 300 transitions back to the dual transmission mode. FIG. 5, below, describes an example process for determining when to transition back to the dual transmission mode. However, in additional or alternative examples, the device 300 can transition back to the dual transmission mode based at least in part on the device 300 determining that the data buffer 322 is empty (e.g., there is no data to be transmitted).

FIG. 5 illustrates an example process 500 for transitioning from an alternating transmission mode to a dual transmission mode, as described herein.

Block 502 illustrates monitoring, in an alternating transmission mode, measurements of characteristics associated with signal(s) received by a device. As described above, in at least one example, the signal monitoring component 316 can monitor measurements of transmission and/or receiving characteristics. The transmission and/or receiving characteristics can include, but are not limited to, transmission power, signal-to-noise ratio, RF headroom, RSRP, RSRQ, RSSI, etc., as described above.

Block 504 illustrates determining whether a measurement of the measurements meets or falls below a threshold. In at least one example, the mode determining component 318 can compare a measurement of a transmission and/or receiving characteristic with a threshold. If the device 300 is in the alternating transmission mode, and the measurement meets or falls below the threshold, the mode determining component 318 can determine to transition the device 300 from the alternating transmission mode to the dual transmission mode, as illustrated in block 506. In some examples, the measurement may need to meet or fall below the threshold for a period of time before the mode determining component 318 determines to transition the device 300 to the dual transmission mode. In such an example, the scheduling component 320 can return to sending scheduling requests to the LTE base station 104 and the NR base station 106 at substantially the same time and transmitting data to the LTE base station and the NR base station 106 at substantially the same time. If the device 300 is in the dual transmission mode, and the measurement does not meet or fall below the threshold, the mode determining component 318 can determine not to transition the device 300 from the alternating transmission mode to the dual transmission mode, as illustrated in block 508.

As described above, in some examples, the threshold for triggering a transition from the dual transmission mode to the alternating transmission mode can be greater than the threshold for trigging a transition from the alternating transmission mode to the dual transmission mode. That is, in some examples, the threshold for trigging a transition from the alternating transmission mode to the dual transmission mode can be configured to be less than the threshold for triggering a transition from the dual transmission mode to the alternating transmission mode to ensure that the quality of service is maintained through the transition.

In some examples, each transmission and/or receiving characteristic can be associated with its own thresholds. That is, as a non-limiting example, transmission power can be associated with a 17 dBm threshold, such that if the transmission power of the device 300 meets or exceeds 17 dBm, the mode determining component 318 determines to transmission the device 300 into the alternating transmission mode. Other transmission and/or receiving characteristics can be associated with their own thresholds. In at least one example, the mode determining component 318 can determine a single measurement meets or exceeds a threshold and can trigger a transition to a different mode. In other examples, the mode determining component 318 can determine multiple measurements meet or exceed a threshold and can trigger a transition to a different mode.

As described above, techniques described herein enable 5G network coverage extension. That is, by determining when to transition from a dual transmission mode to an alternating transmission mode—and effectuating such a transition—techniques described herein extend 5G network coverage beyond what is available with conventional techniques (e.g., only operating in the dual transmission mode). As a result, UEs can utilize the benefits of increased speed and throughput offered by the 5G network (vs. the 4G network) for a longer period of time than what is available with conventional technologies (e.g., only operating in the dual transmission mode). Furthermore, while UEs utilize both the 4G network and the 5G network via an alternating pattern, the quality of service can increase because the UEs are not transmitting via bands having the same frequency, and thus the amount of interference decreases. As such, techniques described herein can offer an improved user experience—faster data transmission (e.g., for uploading/downloading), fewer dropped calls, etc.—farther away from existing base stations than what is available with conventional techniques.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
one or more transceivers for transmitting and receiving data via a first network node associated with a 4th generation (4G) network and a second network node associated with a 5th generation (5G) network;
one or more processors;
a memory; and
one or more components stored in the memory and executable by the one or more processors to perform operations comprising:
determining, in a dual transmission mode for transmitting data via the one or more transceivers to the first network node and the second network node at or near a same time, a measurement of a characteristic associated with transmitting or receiving data;
determining that the measurement meets or exceeds a threshold;
based at least in part on determining that the measurement meets or exceeds the threshold, transitioning to an alternating transmission mode;
sending, in the alternating transmission mode and at a first time, a first scheduling request to the first network node;
sending, in the alternating transmission mode and at a second time, a second scheduling request to the second network node; and
transmitting, in the alternating transmission mode, one or more data items to the first network node and the second network node based at least in part on instructions received responsive to the first scheduling request and the second scheduling request, wherein the one or more data items are transmitted to the first network node and the second network node in an alternating pattern,
wherein an order associated with sending the first scheduling request and the second scheduling request is based at least in part on traffic associated with one or more downlink transmissions sent from at least one of the 5G network or the 4G network.

2. The device as claim 1 recites, wherein the characteristic comprises a signal-to-noise ratio.

3. The device as claim 1 recites, wherein the characteristic comprises a transmit power.

4. The device as claim 1 recites, wherein the characteristic comprises radio frequency (RF) headroom.

5. The device as claim 1 recites, wherein the threshold is a configurable threshold that is less than a standards-set maximum measurement.

6. The device as claim 1 recites, wherein a delay between the first time and the second time is based at least in part on a length of a subframe duration of at least one of a first communication associated with the 5G network or a second communication associated with the 4G network.

7. The device as claim 1 recites, wherein the order associated with sending the first scheduling request and the second scheduling request is based at least in part on an amount of data in a data buffer associated with the device.

8. The device as claim 1 recites, the operations further comprising:
determining, in the alternating transmission mode, an updated measurement of the characteristic;
determining that the updated measurement meets or falls below another threshold; and
based at least in part on determining that the updated measurement meets or falls below the other threshold, transitioning back to the dual transmission mode.

9. The device as claim 8 recites, wherein the other threshold is less than the threshold.

10. A computer-implemented method comprising:
determining, in a dual transmission mode for transmitting data to a first network node associated with a 4th generation (4G) network and a second network node associated with a 5th generation (5G) network at or near a same time, a first measurement of a characteristic associated with transmitting or receiving data;
determining that the first measurement meets or exceeds a first threshold;
based at least in part on determining that the first measurement meets or exceeds the first threshold, transitioning to an alternating transmission mode for transmitting data via the first network node and the second network node in an alternating pattern, sending, in the alternating transmission mode and at a first time, a first scheduling request to the first network node;

sending, in the alternating transmission mode and at a second time, a second scheduling request to the second network node; and transmitting one or more data items to the first network node and the second network node based at least in part on instructions received responsive to the first scheduling request and the second scheduling request, wherein an order associated with sending the first scheduling request and the second scheduling request is based at least in part on an amount of data in a data buffer.

11. The computer-implemented method as claim 10 recites, wherein the characteristic comprises a signal-to-noise ratio, a transmit power, a radio frequency (RF) headroom, reference signal received power (RSRP), reference signal received quality (RSRQ), or received signal strength indicator (RSSI).

12. The computer-implemented method as claim 10 recites, wherein a delay between the first time and the second time is based at least in part on a length of a subframe duration of least one of a first communication associated with the 5G network or a second communication associated with the 4G network.

13. The computer-implemented method as claim 10 recites, further comprising:
    determining, in the alternating transmission mode, a second measurement of the characteristic;
    determining that the second measurement meets or falls below a second threshold; and
    based at least in part on determining that the second measurement meets or falls below the second threshold, transitioning back to the dual transmission mode.

14. A device comprising:
    one or more transceivers for transmitting and receiving data via a first network node associated with a 4th generation (4G) network and a second network node associated with a 5th generation (5G) network;
    one or more processors;
    a memory; and
    one or more components stored in the memory and executable by the one or more processors to perform operations comprising:
        monitoring, in a dual transmission mode for transmitting data via the one or more transceivers to the first network node and the second network node at or near a same time, measurements of at least one characteristic associated with at least one of transmitting or receiving data;
        determining that a measurement of the measurements meets or exceeds a threshold; and
        based at least in part on determining that the measurement meets or exceeds the threshold, transitioning to an alternating transmission mode for transmitting data, via the one or more transceivers, to the first network node and the second network node in an alternating pattern;
        sending, in the alternating transmission mode and at a first time, a first scheduling request to the first network node;
        sending, in the alternating transmission mode and at a second time, a second scheduling request to the second network node; and
        transmitting one or more data items to the first network node and the second network node based at least in part on instructions received responsive to the first scheduling request and the second scheduling request,
        wherein an order associated with sending the first scheduling request and the second scheduling request is based at least in part on an amount of data in a data buffer.

15. The device as claim 14 recites, wherein a delay between the first time and the second time is based at least in part on a length of a subframe duration of least one of a first communication associated with the 5G network or a second communication associated with the 4G network.

16. The device as claim 14 recites, further comprising:
    monitoring, in the alternating transmission mode, additional measurements of the at least one characteristic;
    determining that an additional measurement of the additional measurements meets or falls below a second threshold; and
    based at least in part on determining that the additional measurement meets or falls below the second threshold, transitioning back to the dual transmission mode.

17. The device as claim 14 recites, wherein the at least one characteristic comprises one or more of a signal-to-noise ratio, a transmit power, radio frequency (RF) headroom, reference signal received power (RSRP), reference signal received quality (RSRQ), or received signal strength indicator (RSSI).

* * * * *